INVENTOR:
ARIE LIBERMAN
BY
Schroeder, Hofgren, Brady & Wegner
ATT'YS

Feb. 27, 1962

A. LIBERMAN 3,023,273

COMMUNICATION SYSTEM

Filed Sept. 25, 1957

2 Sheets-Sheet 2

INVENTOR:

ARIE LIBERMAN

BY

Schroeder, Hofgren, Brady & Wegner

ATT'YS

United States Patent Office 3,023,273
Patented Feb. 27, 1962

3,023,273
COMMUNICATION SYSTEM

Arie Liberman, % Talk A Phone Co., 1512 S. Pulaski Road, Chicago, Ill.

Filed Sept. 25, 1957, Ser. No. 686,241
19 Claims. (Cl. 179—1)

This invention relates to an intercommunication system and more particularly to improved intercommunication station circuitry for facilitating communication between various stations.

A typical intercommunication system includes at least one and often several "master" stations, together with one or more "staff" or "substation" units, or combinations thereof. A master station in a typical system includes a selector switch for choosing another station with which conversation is desired, and can originate calls to another master or to a staff or substation. A staff station can reply only after it has been called, and a substation can only listen to incoming calls. In previous systems when one master station wishes to communicate with another master station, the calling party operates the appropriate selector switch for the called party, and asks that the called party in turn operate the selector switch for the calling party station, so that he may answer. This requirement of action on the part of the called party in order to reply is undesirable. Another disadvantage of previous systems is that if one station should call another station which is already engaged in conversation with a third station, the calling station will interrupt the conversation being carried on.

It is a principal object of the present invention to provide an improved intercommunication system which will obviate these disadvantages of prior systems, and provide automatic connection between the stations if, but only if the station selected by the calling party is not busy. The calling station need only actuate the appropriate selector switch for the called station to connect the proper circuitry therewith; and the other station, the station being called, is automatically signaled that a call is coming in. If the station being called is busy, a suitable signal is given at the calling station.

Another principal object of the present invention is to provide in a station unit for an intercommunication system which utilizes sound actuated switching circuitry to effect desired interconnection between the elements of the station circuits, rather than manually operated switches.

One feature of the invention is the provision in a multistation unit, intercommunication system of a plurality of stations, each including a normally disabled circuit which is necessary for operation, enabling circuit means in each station and operably associated with the disabled circuit, and means for interconnecting the enabling circuit means of two stations in order to effect communication therebetween, such interconnection actuating the enabling circuit means in each station to bring the normally disabled circuits therein into operation. Another feature is that circuit means in the stations are actuated on establishment of communication between two stations, for altering the circuit of the enabling circuit means to prevent interconnection with and actuation of the enabling circuit means of a third station. A further feature is that selectively operable conference circuit means are provided for permitting the simultaneous actuation of the enabling circuit means in each of a plurality of stations connected with a single station. Still another feature is that means are provided in each station, interconnected with the enabling circuit means, for indicating the condition thereof.

A further feature is that the enabling circuit means of each station includes a relay having an actuating coil which is interconnected with the actuating coil of the relay in another station with which communication is desired. Yet a further feature is that the circuit of the relay coils of the stations are altered upon establishment of communication between stations.

Another feature is that each station includes selector switch means having a plurality of portions for choosing the station with which communication is desired, and a condition selector switch having a normal first position and a second position, means associated with the selector switch means and the condition selector switch for effecting movement of the selector switch from the first to the second position when a selector switch portion is actuated. Still a further feature is that outgoing calls from a station are connected through the portions of the selector switch means, while incoming calls pass through the condition selector switch.

Yet another feature is the provision in an intercommunication system station of an amplifier having an input and an output, a transducer for effecting a conversion between audio and electrical signals, circuit means for connecting the station with another station, and sound controlled means for effecting desired connections between the transducer, amplifier and circuit means, and including time delay circuit means for actuating the sound controlled switch means. A further feature is that the sound controlled switch means includes two relays, one actuable to connect the elements of the station for the reception of sound and the other actuable to connect the elements of the system for transmission of sound, and the two relays each include means operated upon actuation of the associated relays for preventing actuation of the other relay. Yet another feature is that the transducer is connected to the input of the amplifier in the absence of a signal to the sound controlled switch means.

Further features and advantages of the invention will readily be apparent from the following specification and from the drawings in which.

The intercommunication system which is disclosed in detail herein is one in which the signals from one station to the other are transmitted over special cables connected between the units, as distinguished from a system in which a modulated carrier is transmitted between units, as over power lines. However, it will be understood that there are several features of the present invention which are applicable to either type of system, as will be apparent from the detailed description which follows.

Figure 1:
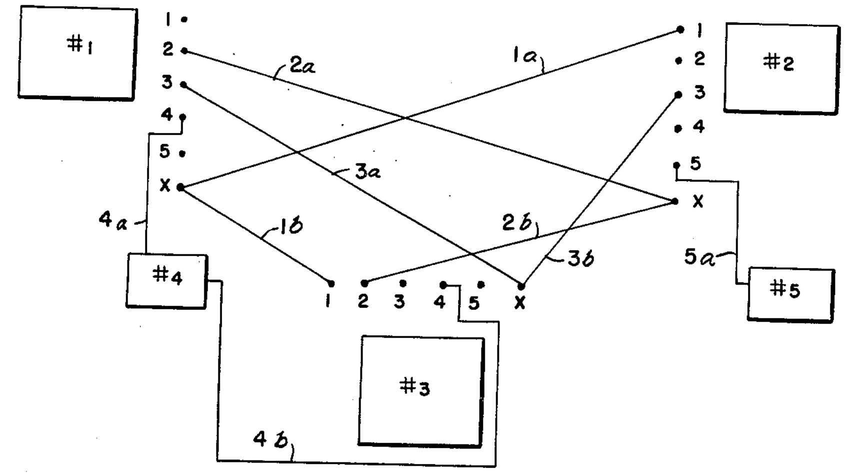
FIGURE 1 is a diagrammatic representation of an intercommunication system.

Referring to FIGURE 1, a system is illustrated diagrammatically which includes three master stations, numbers 1, 2 and 3, and two staff or substations, numbers 4 and 5. Each of the master units is provided with suitable cable terminals designated 1, 2, 3, 4, 5 and X. Considering first the connections to station No. 1, cables 2*a* and 3*a* are connected between terminals 2 and 3, respectively of unit 1 and the "X" terminal at each of stations 2 and 3. Cables 1*a* and 1*b* are connected between the "X" terminal of station 1 and the No. 1 terminal of stations 2 and 3. Cable 3*b* is connected between the No. 3 terminal of station 2 and the "X" terminal of station 3 while cable 2*b* is connected between the No. 2 terminal of station 3 and the "X" terminal of station 2. Station No. 4 is connected by cables 4*a* and 4*b* to the No. 4 terminal of stations 1 and 3, while station 5 is connected by cable 5*a* to the No. 5 terminal of master station 2. With this system, each of the master stations, 1, 2 and 3, can communicate with each other. Master stations 1 and 3 can communicate with station 4 while station 2 can communicate with station 5.

Figure 2:
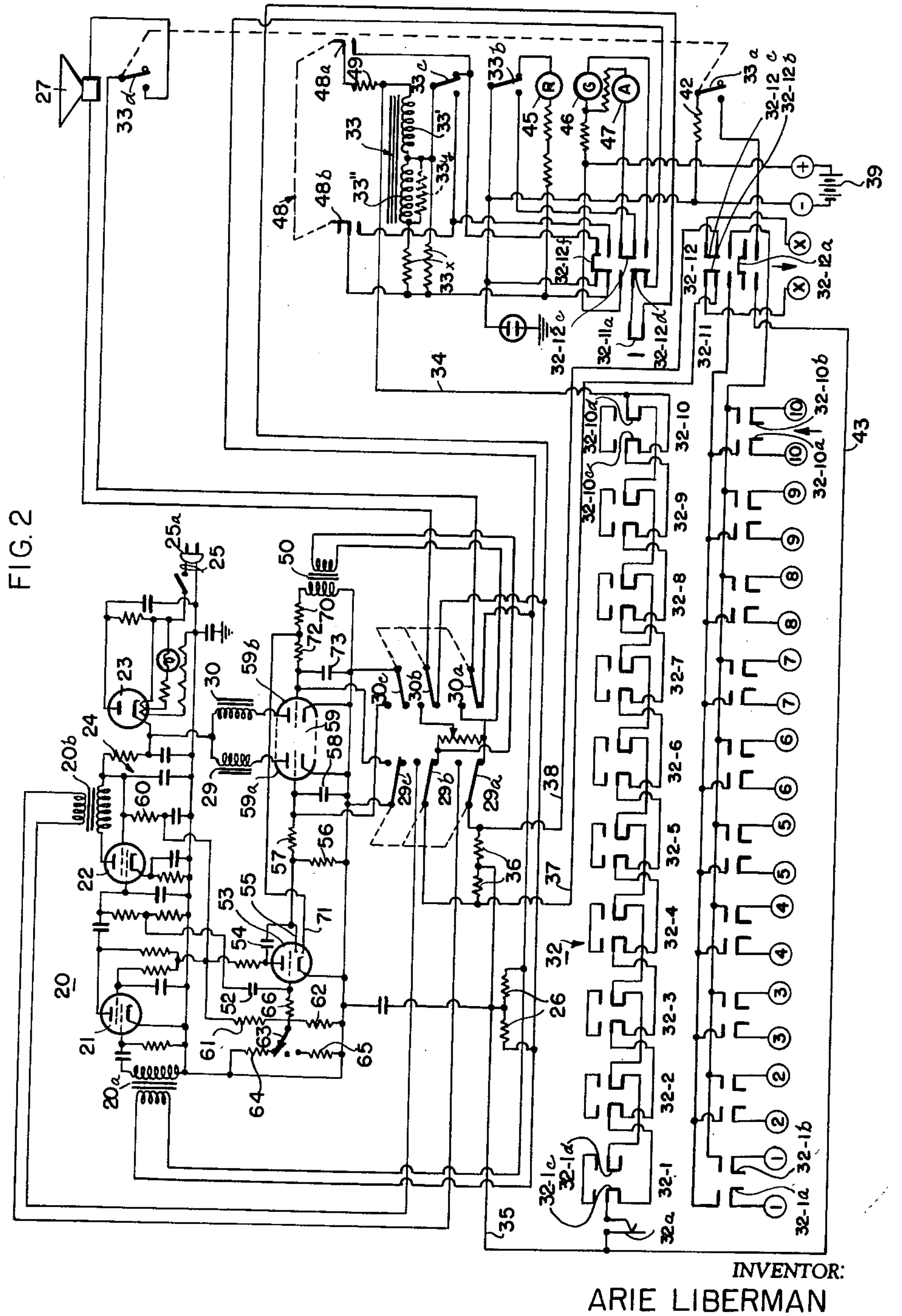
FIGURE 2 is a schematic circuit diagram of a master station embodying the invention.

Turning now to FIGURE 2, the circuit of a master station will be considered in detail. In describing the circuit, certain specific values and component types will be specified for some of the elements. It is to be understood that this specific description is intended only to be illustrative of an operative circuit and is not intended to imply that any of the component values are critical in nature, unless it is specifically so stated.

Each master unit, as the units numbered 1, 2 and 3, in FIGURE 1, includes an amplifier 20 having an input transformer 20*a* and an output transformer 20*b*, and the amplifier comprises a voltage amplifying stage 21, a 12AU6, and a power amplifier 22, a 50C5. A halfwave rectifier 23, 35W4, feeding a capacitor input filter network 24, may be connected with a suitable source of power, as 110 volts A.C., through line 25 and plug 25*a*. Shunted across the primary winding of input transformer 20*a* is a resistive balancing network, or couple, including a pair of matched 150 ohm resistors, 26. A bidirectional transducer 27 serves as a loud speaker when the station is receiving a call, and as a microphone when a call is being transmitted. Suitable connections are made between the transducer 27 and the other elements of the system, through the contacts associated with sound actuated relays 29 and 30, the circuits of which will be discussed in detail below. Turning now to the consideration of the selector circuitry by means of which connection may be made with other stations of the system, it will be seen that the master station is provided with a set of pairs of terminals numbered 1—1 through 10—10 and a pair of terminals designated X—X, to which the appropriate cables are connected (FIGURE 1). Similarly, assuming that the master unit shown in FIGURE 2 is the unit number 1 of the system, a cable will connect the terminals X—X with the number 1 terminals of each of the other stations.

Selector switch means 32 includes portions 32–1 through 32–10, one portion being associated with each of the terminal pairs 1—10, respectively. Switch section 32–12 comprises a condition selector switch. Station selector switch portions 32–1 through 32–10 and condition selector switch 32–12 are mechanically interconnected through a latch bar arrangement (not shown) so that depression of any switch or switch portion latches it in depressed position and simultaneously releases any other switch which may have been depressed previously. Under normal conditions, i.e. when no call is orginating at the station, the switch 32–12 is depressed and the contacts associated therewith are in the positions shown in the drawing. When a station selector switch portion is depressed, condition selector switch 32–12 is released and the movable contact elements thereof move one position downwardly, in the direction of the arrow shown on the drawing.

It will be noted that the circuit of transducer 27 includes a contact 33*d* associated with enabling relay 33, which contact is open when the relay is not energized, as it is shown in the drawing. Thus, with the circuit so far described, the station is inoperative. In order to energize relay 33 and connect transducer 27 for operation, it is necessary to make connections in a certain manner with another station of the system.

Considering first the circuit of relay 33 shown in FIGURE 2, it is seen that one terminal of the relay coil, which is made up of two portions 33′ and 33″, is connected through wire 34, contacts 32–10*c* and 32–10*d*, and the corresponding contacts of selector switch portions 32–1 through 32–9, momentary opening switch 32*a* and wire 35 to the center point of resistive line balancing couple made up of matched resistors 36, 47 ohms each. The line balancing couple made up of resistors 36 is connected between wires 37 and 38 which in turn are connected through contacts 32–12*b* and 32–12*c* of the condition selector switch 32–12, with terminals X—X. The other side of the coil of enabling circuit relay 33 is connected through contact 32–12*f* of the condition selector switch with the negative terminal of a D.C. power supply, such as battery 39. Relay coil portion 33″ is shorted by a circuit through relay contact 33*c* and condition selector switch contact 32–12*f*. This is the condition of a circuit which is ready to receive a call from another station.

In order to initiate a call it is necessary only that the calling party depress a single one of the selector buttons 32–1 through 32–10, except for the button corresponding to the station from which the call originates, of course. Assuming that the button 32–10 is depressed, several things occur. The contacts 32–10*a*, 32–10*b*, 32–10*c* and 32–10*d* all move upwardly one position as indicated by the arrow on FIGURE 2, and the switch portion 32–10 latches in this position. At the same time switch 32–12 is released and all of the movable switch contacts 32–12*a* through 32–12*f* move downwardly one position. The circuit of the coil of enabling relay 33 may now be traced from one terminal through wire 34, contacts 32–10*d* and 32–10*c* now connected in series and the contacts corresponding with 32–10*c* in the other selector switch portions, through momentary switch 32*a*, and wire 35 to the midpoint of the line balancing couple. The circuit is completed from the other side of relay 33 through contact 32–12*f* to the positive terminal of battery 39. Wires 37 and 38 are connected through contacts 32–12*b* and 32–12*c* and contacts 32–10*a* and 32–10*b*, with cable terminals 10—10.

Figure 3:
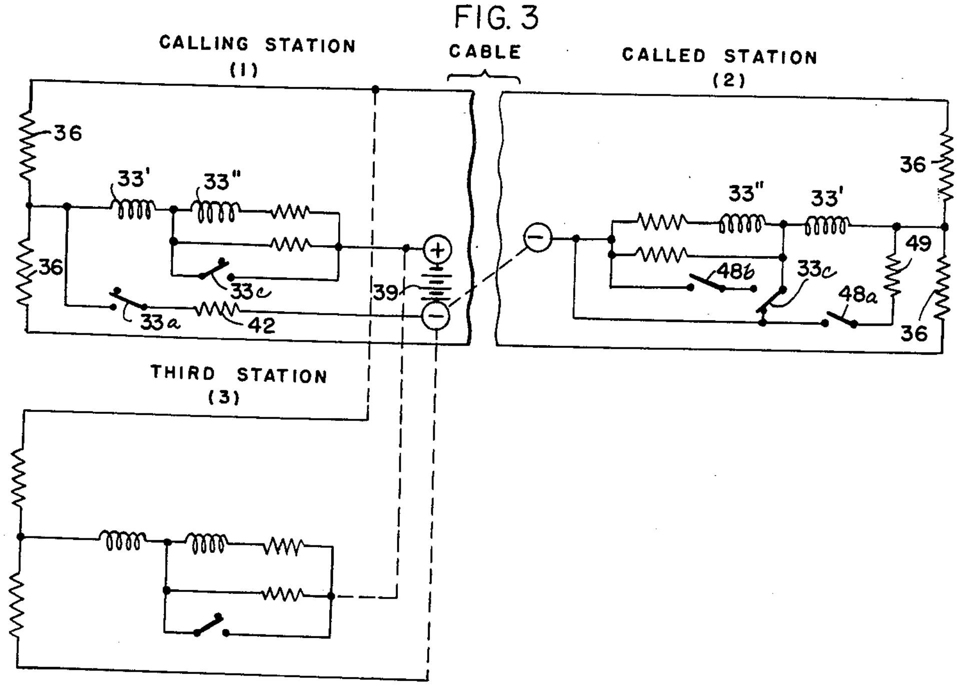
FIGURE 3 is a partial schematic diagram of the enabling circuits of two stations, illustrating the interconnection thereof.

Turning now to FIGURE 3, the circuits for enabling relays 33 of two stations, (1) calling (on the left) and (2) being called (on the right), are shown in simplified form with the contacts of the selector switches eliminated for clarity. The contact 33*c* associated with each of the enabling relays is shown in its deenergized condition. A circuit may be traced from the positive terminal of the battery 39 through both coil portions 33″ and 33′ of the enabling relay of the calling station, through parallel paths each including one of the resistors 36 of the line balance couple of the calling station, the cable between the two stations and the line balance couple resistors at the called station. The circuit is then completed through enabling relay coil portion 33′ in the called station and contact 33*c*, which shorts coil portion 33″, to the negative terminal of battery 39. The relay coils are so chosen that the current flowing through this circuit is sufficient to energize the relay in the calling station. This operates contact 33*c* associated therewith shorting coil portion 33″, reducing the circuit impedance so that the current increases, energizing enabling relay 33 in the called station. The energization of the enabling relays closes contact 33*d* associated with each, in the circuit of the transducers at each station, permitting the stations to come into operation.

There are several other effects in the circuit of the enabling relay coils which should also be considered. Contacts 33*c* associated with the enabling circuit relay in the called station opens the shorting circuit around coil portion 33″ of the relay in that station, putting the entire relay coil in the circuit. The current flowing in the circuit, however, remains sufficient to keep the relays energized. At the same time, contact 33*a* closes completing a circuit in the calling station from the negative terminal of battery 39 through a resistor 42, 2200 ohms, contact 32–12*a*, wire 43, and wire 35 to the center point of the line balancing couple. The resistor 42 in effect shunts the enabling relay coil circuit of the called station together with the line balancing couples in both of the stations, increasing the current through the enabling relay coil in the calling station.

Consider now what would happen if a third station tries to call the station which is the called party in the circuit of FIGURE 3. In a station initiating a call, the entire enabling relay coil, comprising portions 33′ and 33″ is connected in the circuit. This circuit is essentially connected in parallel with the circuit of the enabling relay of the calling station as shown in broken lines. Coil portion 33″ of the enabling relay of the calling station (1) is shorted out so that the impedance of this circuit is quite low, while the impedance of the enabling relay coil of the third station is high, as the entire coil is in the circuit. This parallel circuit is connected in series with the entire relay coil of the enabling relay of the called station (2) across the voltage source 39. A brief consideration of this circuit shows that of the current flowing in the circuit, the major portion flows through the coil 33′ of the enabling relay of the calling station (1). The characteristics of the relays are so chosen and so correlated with the voltage of source 39 that insufficient current flows through the circuit of the enabling relay of the third station to energize its enabling relay. Thus, the circuit of the transducer 27 of the third station is never completed and the party at the third station can neither interrupt the conversaion between the calling and called stations nor can he listen in or monitor this conversation. The resistor 42, which is effectively shunted across the called station, increases the total current flow through the circuit so that sufficient current always flows through coil portion 33′ of the calling station (1) enabling relay even though several additional stations may try to call the called station (2) at the same time, and thus all shunt the circuit of the enabling relay in the calling station (1).

In order that the enabling circuit operate properly, it is necessary that the relay coil impedance and the current necessary to actuate the relays, with both full and partial coils in the circuit, be maintained within close limits. In a typical case, the relay coil has a resistance of 150 ohms, equally divided between the two coil portions 33′ and 33″. The relay is actuated by a current of 68 ma. (milliamperes) flowing through a single coil portion, or 52 ma. flowing through the entire coil. A relay with a single coil portion energized will drop out at about 25 ma. If calibrated relays of sufficient accuracy are not available commercially, the coils may be calibrated simply by connecting suitable series or shunt resistors 33X and 33Y thereto. The resistance and current figures given above for the enabling relay coils are selected for a battery 39 having a voltage of the order of 16.5 volts.

A brief consideration of the circuit of FIGURE 2 will show that if a third station should attempt to call the calling station (1), no circuit is completed. It will be recalled that when the party at the calling station selects the station to be called, the selector switch portion corresponding to that station is depressed releasing condition selector switch 32–12. Now, if a third station wishes to call the calling station in the hypothetical situation, the party at the third station presses the selector switch portion corresponding with that station, completing a circuit from the enabling relay in such station through an appropriate cable to the terminals X—X of the calling station. But since the station the third party is trying to call has already initiated a call to another station, contacts 32–12*b* and 32–12*c* of the condition selector switch therein have broken the circuit to terminals X—X, so that no circuit is completed.

Signal lights are associated with the circuit of enabling relay 33 and condition selector switch 32–12, to indicate the condition of the enabling circuit. Referring once again to FIGURE 2, and assuming the station shown there is calling another station, and that condition selector switch 32–12 has been released, a circuit is completed from the negative terminal of battery 39 through relay contact 33*b*, red light 45 and contact 32–12*f* to the positive terminal of battery 39, energizing the red light. As soon as enabling relay 33 is energized and a circuit is completed and ready for operation, contact 33*b* reverses its position breaking the circuit to red light 45 and completing a circuit from the negative terminal of battery 39 through contact 32–12*e* energizing green light 46 indicating that the circuit has been completed. If the station being called is busy so that relay 33 does not become energized, the red light remains lighted and the calling party is thus informed that the party being called is already in communication with someone else. When the relay 33 in the called station is energized, a circuit is completed through contact 33*b* in that station, completing a circuit through contact 32–12*e* lighting amber light 47 indicating to the party at the called staion that a call is waiting for him.

As discussed above, the circuits of the enabling relays 33 are such that normally only two stations may be in communication at the same time. In order to permit a conference hookup between several master stations, a special conference circuit is provided. Conference switch 48 has two portions: 48*a* which closes momentarily when the switch is actuated; and 48*b* which latches closed until it is released at the end of the conference. Contact 48*a* completes a circuit shunting resistor 49, 15 ohms, across the entire coil of the enabling relay 33 in the station at which the switch is actuated. Contact 48*b* remains closed during the conference, shunting coil portion 33″ through contact 33*c*. The conference circuit is set up as follows: The party desiring a conference calls each of the stations which are to be in the conference and asks each one to call him back in a few moments. After each of the stations has been alerted, the party calling the conference depresses the condition selector switch 32–12, and then momentarily closes the conference switch, closing contacts 48*a* and 48*b*. With the low resistance 49 shunted across the coil of the relay 33, the impedance of the circuit is low enough that each of the parties to the conference may call and sufficient current will flow to energize the enabling relay in each of the other stations. The person desiring the conference is thus in the position of the called party, and when he releases the conference switch, after each of the other parties is connected, opening contact 48*a*, but leaving contact 48*b* closed, the enabling relay 33 in his station will be energized. The conference may then proceed in a normal manner and should anyone else try to call one of the parties to the conference, his call will be blocked off in the manner described above.

The circuit connections through the selector switch portions for the various stations, and particularly the *c* and *d* connections, such as 32–10*c* and 32–10*d*, prevent calling two stations at the same time, even though two of the selector switch portions are depressed. If two selector switch portions are depressed simultaneously and latched into depressed position, the circuit from wire 34 to wire 35 through the selector switches is not completed, so that the series circuit of the enabling relays is never set up. The momentary opening switch 32*a*, which is also connected in series in this line, is opened mechanically by latch bar of the switch mechanism each time one of the switches, either the selector switch portions 32–1 through 32–10, or the condition selector switch 32–12, is depressed positively breaking the circuit of enabling relay 33 and clearing the system for a new call.

The operation of the sound controlled switching circuit, including relays 29 and 30 will now be considered. It will be assumed that the station shown in FIGURE 2 is connected with another station, as another master, or a staff or substation so that relay 33 is energized and contact 33*d* in the circuit of transducer 27 is closed. It will be assumed also that no sound is present in the system, i.e. neither party is speaking. With this situation, both relays 29 and 30 are energized and the contacts associated therewith are in the positions shown in FIGURE 2. The transducer 27 is connected through contacts 30*a* and 30*b* of relay 30 with the primary winding of amplifier input transformer 20*a*, while the line with which the station is communicating, which is connected through condition selector switch 32–12 with wires 37 and 38, is connected through relay contacts 29*a* and 29*b* with the primary winding of transformer 50 in one of the sound control channels.

Assuming that the party at the station shown in FIGURE 2 speaks first, his voice is picked up by transducer 27 and coupled through it to the input transformer 20*a* of the amplifier. The amplified signal appears in the secondary winding of output transformer 20*b*. A portion of the audio signal is picked up from the output of voltage amplifier 21 and coupled through capacitor 52, .005 μf. (microfarads), to the control grid of the triode section of tube 53, a 12AV6, the amplified output of the triode section of tube 53 is coupled through capacitor 54, .005 μf. to one of the anodes 55 of the rectifier section thereof, and the rectified signal is coupled through an integrating network made up of shunt resistor 56, 4.7 megohms, series resistor 57, 2.2 megohms, and shunt capacitor 58, .01 μf. to the control grid of one of the triode sections 59*a* of control tube 59, a 12AU7 dual triode. The negative voltage developed on the grid of the triode reduces the plate current thereof to such an extent that relay 29 drops out reversing the connections of the contacts associated therewith. Contacts 29*a* and 29*b*, which are connected with the line to the other station are switched to the secondary winding of output transformer 20*b*. Contact 29*c* closes shorting the grid of the other amplifier section 59*b* to ground, preventing any incoming signal which might appear in transformer 50 from affecting the circuit.

The control grid of voltage amplifier 53 is biased positively by a resistance network connected with the B+ supply of the amplifier and including dropping resistor 60, 4700 ohms, resistors 61, 100,000 ohms and 62, 47,000 ohms. A sensitivity selector switch 63 has three positions: maximum—in which a 10,000 ohms resistor 64 is shunted across resistor 62; medium—in which resistor 65, 15,000 ohms is shunted across resistor 62; and minimum—in which no resistance is shunted across resistor 62. Resistor 66, 22,000 ohms is connected in series with the grid of tube 53.

The time constant of the grid circuit of control tube 59*a* is such that the tube does not begin to conduct heavily while the speaker is talking so that it is impossible for the other party to interrupt. The tube current may increase and energize relay 29 if the speaker pauses, but as soon as he resumes the relay will again drop out. When the party speaking does finish, relay 29 is again energized, returning the contacts to the position shown in the drawing.

As soon as the other party begins to speak, the amplified signal from the other station is connected through contacts 29*a* and 29*b* to the primary winding of transformer 50 and thence through series resistor 70, 470,000 ohms to the anode 71 of the rectifier section of tube 53. The rectified signal developed there is coupled through the integrating circuit made up of resistor 72, 10 megohms and shunt capacitor 73, .005 μf. to the control grid of tube 59*b*, the second half of the dual triode control tube 59. When relay 30 is actuated, the contacts associated therewith all reverse their connections, and the transducer 27 is connected through contacts 30*a* and 30*b* to receive the incoming signal on wires 37 and 38. Variable resistor 75, shunted across the line provides a volume control. Contact 30*c* grounds the control grid of triode 59*a*, preventing actuation of relay 29 while the other party to the conversation is talking. The time constant in the grid circuit of control tube 59*b* is, as in the case of the circuit of tube 59*a*, such that the party speaking may pause between words for a short period without reversing the connections of the contacts.

A privacy switch 32–11 is provided which prevents another party from monitoring conversations at the local station. Switch 32–11 is manually operated and may be latched in operated condition, although it is not a part of the latch bar selector switch mechanism including switch portions 32–1 through 32–10 and condition selector switch 32–12. As shown in FIGURE 2, the switch has been operated and its single movable contact 32–11*a* completes a circuit through condition selector switch contact 32–12*d*, shorting the primary winding of amplifier input transformer 20*a*. Thus, even if another party has called the party who has privacy switch 32–11*a* closed, no signals are sent out until the privacy switch is released as the amplifier is inoperative. If the party utilizing the privacy switch calls another party, however, the circuit is automatically broken by the release of condition selector switch 32–12.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a multi-station intercommunication system: a plurality of stations each including a normally disabled circuit which is necessary for operation; enabling circuit means, including a relay in each station, each relay having an actuating coil and a normally open contact, said contact being located in the disabled circuit of the station containing said relay, a source of relay operating potential; cable means interconnecting said stations and said source; and a station selector switch actuable at one station for selecting another station for communication, actuation of said switch interconnecting the actuating coils of the enabling circuit relays of said one station and the selected other station, said selector switch and said relay coils being connected through said cable means with each other and with the source of relay operating potential to establish communication between the stations, such interconnection completing a circuit through said cable means for energizing both said relay coils to actuate the relays in both said one and said selected other stations, thereby closing the normally open contacts in said both stations to bring both said normally disabled circuits into operative condition for two-way intercommunication between said one and said selected other stations.

2. In a multistation intercommunication system: a plurality of stations each including a normally disabled circuit which is necessary for operation; enabling circuit means in each station and operably associated with said disabled circuit; means for interconnecting the enabling circuit means of two stations in order to effect communication therebetween, such interconnection actuating the enabling circuit means in each station to bring the normally disabled circuits into operation; and circuit means in each station, actuated on establishment of communication with another station, for altering the circuit of said enabling circuit means to prevent interconnection with and actuation of the enabling circuit means of a third station.

3. In a multistation intercommunication system: a plurality of stations each including a normally disabled circuit which is necessary for operation; enabling circuit means in each station and operably associated with said disabled circuit; means for interconnecting the enabling circuit means of two stations in order to effect communication therebetween, such interconnection actuating the enabling circuit means in each station to bring the normally disabled circuits into operation; circuit means in each station, actuated on establishment of communication with another station, for altering the circuit of said enabling circuit means to prevent interconnection with and actuation of the enabling circuit means of a third station; and selectively operable conference circuit means in one station for effecting simultaneous actuation of the enabling circuit means in each of a plurality of stations connected with said one station.

4. In a multistation intercommunication system: a plurality of stations each including a normally disabled circuit which is necessary for operation; enabling circuit means including a relay having an actuating coil in each station, and having a normally open contact associated therewith in said disabled circuit; means for interconnecting the enabling circuit means of two stations in order to effect communication therebetween, such interconnection actuating said relays to close said contacts and bring said normally disabled circuits into operation; and means actuated by said relays for altering the circuits of the relay coils upon establishment of communication between said two stations.

5. The intercommunication system of claim 4, wherein each relay coil includes two coil portions, and said circuit means includes means for shorting one portion thereof.

6. In a multistation intercommunication system: a plurality of stations each including a normally disabled circuit which is necessary for operation; enabling circuit means including a relay having an actuating coil in each station, and having a normally open contact associated therewith in said disabled circuit; means for interconnecting the enabling circuit means of two stations in order to effect communication therebetween, such interconnection actuating said relays to close said contacts and bring said normally disabled circuits into operation; circuit means actuated by the relays for altering the relay coil circuits upon establishment of a connection between said stations, each of said relay coils including two coil portions, said last mentioned circuit means shorting a portion of the coil of one of said relays before said relays are actuated and shorting a portion of the other coil after said relays are actuated.

7. Intercommuniction system of the character described in claim 6, wherein said last mentioned circuit means connects an impedance in shunt with the partially shorted relay coil upon actuation of said relays.

8. In a multistation intercommunication system: a plurality of stations, each including a normally disabled circuit which is necessary for operation; selector switch means in each station, including a switch portion for each of the other stations and operable to connect said one station with a desired other station; enabling circuit means in each station and operably associated with said disabled circuit; means for interconnecting said enabling circuit means of two stations through a portion of said selector switch means in order to effect communication between two stations, such interconnection actuating the enabling circuit means to bring said normally disabled circuits into operation; and circuit means associated with said selector switch portions for interrupting said enabling circuit if more than one of said switch portions is operated.

9. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; means associated with said selector switch means and said condition selector switch for effecting movement of said condition selector switch from said first position to said second position when a portion of said selector switch means is operated; enabling circuit means in each station and operably associated with said disabled circuit; and means for interconnecting said enabling circuit means of two stations, through said condition selector switch and a portion of said selector switch means in order to effect communication between said two stations, such interconnection actuating the enabling circuit means to bring said normally disabled circuits into operation.

10. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; enabling circuit means in each station and including a relay having an actuating coil, and a normally open contact associated therewith in said disabled circuit; means for interconnecting the enabling circuit means of two stations through said condition selector switch and a portion of said selector switch means in order to effect communication between said two stations, such interconnection actuating said relays to bring said normally disabled circuits into operation; and means actuated by said relays for altering the circuits of the relay coils upon establishment of a connection between said two stations.

11. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; enabling circuit means in each station and including a relay having an actuating coil, and a normally open contact associated therewith in said disabled circuit; means for interconnecting the enabling circuit means of two stations through said condition selector switch and a portion of said selector switch means in order to effect communication between said two stations, such interconnection actuating said relays to bring said normally disabled circuits into operation; and means actuated by said relays for altering the relay coil circuits upon establishment of said stations, each of said relay coils including two coil portions, said last mentioned circuit means shorting a portion of the coil of one of said relays before such relay is actuated and shorting a portion of the other relay coil after said relays are actuated.

12. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; enabling circuit means in each station and including a relay having an actuating coil, and a normally open contact associated therewith in said disabled circuit; means for interconnecting the enabling circuit means of two stations through said condition selector switch and a portion of said selector switch means in order to effect communication between said two stations, such interconnection actuating said relays to bring said normally disabled circuits into operation; and means for interconnecting said enabling circuit means of two stations, through said condition selector switch and a portion of said selector switch means in order to effect communication between said two stations, a selector switch portion in the calling station, corresponding with the called station being actuated and the condition selector switch of said calling station being in said second condition, the condition selector switch of said called station being in the first condition; circuit means actuated by the relays for altering the relay coil circuits upon establishment of a connection between said stations, each of said relay coils including two coil portions, said last mentioned circuit means shorting a portion of the coil of the relay in said calling station before connection is made and said relays are actuated, said short being removed upon actuation thereof, and said last mentioned circuit means effecting a short of a portion of the coil of the relay in said called station upon actuation of the relays; and further circuit means connecting an impedance in shunt with the relay coil in said called station upon actuation of said relays.

13. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; means associated with said selector switch means and said condition selector switch for effecting movement of said condition selector switch from said first position to said second position when said selector switch portion is operated; enabling circuit means in each station and operably associated with said disabled circuit; means for interconnecting the enabling circuit means of two stations, through said condition selector switch and a portion of said selector switch means in order to effect communication between said two stations, such interconnection actuating the enabling circuit means to bring said normally disabled circuits into operation; and means at each station and interconnected with said enabling circuit means for indicating the condition thereof.

14. An intercommunication system of the character described in claim 13, wherein said condition indicating means includes a plurality of lights interconnected with said enabling circuit means and condition selector switch for indicating whether said enabling circuit means are actuated.

15. In a multistation intercommunication system: a plurality of stations each including a normally disabled circuit which is necessary for operation; enabling circuit means including a relay having an actuating coil in each station, and having a normally open contact associated therewith in said disabled circuit; means for interconnecting the enabling circuit means of two stations in order to effect communication therebetween, such interconnection actuating said relays to bring said normally disabled circuits into operation; circuit means in each station, actuated on establishment of communication with another station, for altering said enabling circuit to prevent interconnection with and actuation of the enabling circuit of a third station; and selectively operable conference circuit means in one station for modifying the enabling circuit in said one station for effecting simultaneous actuation of the enabling circuit means in each of a plurality of stations connected with said one station.

16. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; enabling circuit means in each station and including a relay having an actuating coil, and a normally open contact associated therewith in said disabled circuit; means for interconnecting said enabling circuit means of two stations, through said condition selector switch and a portion of said selector switch means in order to effect communication between said two stations, such interconnection actuating said relays to bring said normally disabled circuits into operation; means actuated by said relays for altering the circuits of the relay coils upon establishment of communication between said two stations; and selectively operable conference circuit means in one station for shunting the actuating coil of the relay in said one station with a low impedance element for effecting simultaneous actuation of the enabling circuit means in each of a plurality of stations connected with said one station.

17. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; means associated with said selector switch means and said condition selector switch for effecting movement of said condition selector switch from said first position to said second position when said selector switch portion is operated; enabling circuit means in each station and operably associated with said disabled circuit; means for interconnecting said enabling circuit means of two stations, through said condition selector switch and a portion of said selector switch means in order to effect communication between said two stations, such interconnection actuating the enabling circuit means to bring said normally disabled circuits into operation; means for routing outgoing calls through the portion of said selector switch means corresponding with the station to which said call is directed; and means for routing incoming calls through said condition selector switch.

18. In a multistation intercommunication system: a plurality of stations each including a normally disabled circuit which is necessary for operation; selector switch means in each station, including a switch portion for each of the other stations and operable to connect said one station with a desired other station; a condition selector switch having a normal first position and a second position; enabling circuit means in each station and including a relay having an actuating coil, and a normally open contact associated therewith in said disabled circuit; means for interconnecting the enabling circuit means of two stations through said condition selector switch and a portion of said selector switch means in order to effect communication between said two stations, such interconnection actuating said relays to bring said normally disabled circuits into operation; means for interconnecting said enabling circuit means of two stations, through said condition selector switch and a portion of said selector switch means in order to effect communication between said two stations, a selector switch portion in the calling station, corresponding with the called station being actuated and the condition selector switch of said calling station being in said second condition, the condition selector switch of said called station being in the first condition; circuit means actuated by the enabling relays for altering the relay coil circuits upon establishment of a connection between said stations, each of said relay coils including two coil portions, said last mentioned circuit means shorting a portion of the coil of the relay in said calling station before connection is made and said relays are actuated, said short being removed upon actuation thereof, and said last mentioned circuit means effecting a short of a portion of the coil of the relay in said called station upon actuation of the relays; circuit means connecting an impedance in shunt with the relay coil in said called station upon actuation of said relays; means for routing outgoing calls through the portion of said selector switch means corresponding with the station to which said call is directed; and means for routing incoming calls through said condition selector switch.

19. In an intercommunication system station: an amplifier having an input and an output; a transducer for effecting a conversion between audio and electrical signals; circuit means for connecting said station with another station; sound controlled means for effecting desired connectings between said transducer amplifier and circuit means, said sound controlled means including two relays, one actuated by sound originating at said intercommunication system station and the other being actuated by sound originating at said other station, said one relay when actuated connecting said transducer to the input of said amplifier and connecting the ouput of said amplifier to said circuit means, said other relay, when actuated, connecting said transducer to said circuit means; and means associated with each of said relays and operable upon actuation thereof for preventing actuation of the other.

References Cited in the file of this patent

UNITED STATES PATENTS

| | | |
|---|---|---|
| 1,356,256 | Britten | Oct. 19, 1920 |
| 2,102,903 | Leveque | Dec. 21, 1937 |
| 2,477,275 | Tschumi | July 26, 1949 |
| 2,529,912 | Campbell | Nov. 14, 1950 |
| 2,545,476 | Levy | Mar. 20, 1951 |
| 2,830,127 | Ferguson | Apr. 8, 1958 |